(12) United States Patent
Nishimura

(10) Patent No.: US 6,501,704 B2
(45) Date of Patent: Dec. 31, 2002

(54) UNDERWATER OBJECT POSITIONING SYSTEM

(75) Inventor: Kiyokazu Nishimura, c/o National Institute of Advanced Industrial Science and Technology 1-1-1 Higashi, Tsukuba, Ibaraki 305-8567 (JP)

(73) Assignees: National Institute of Advanced Industrial Science and Technology, Tokyo (JP); Kiyokazu Nishimura, Tsukuba (JP)

(*) Notice: Subject to any disclaimer, the term of this patent is extended or adjusted under 35 U.S.C. 154(b) by 0 days.

(21) Appl. No.: 09/989,075

(22) Filed: Nov. 21, 2001

(65) Prior Publication Data

US 2002/0064092 A1 May 30, 2002

(30) Foreign Application Priority Data

Nov. 22, 2000 (JP) ........................................ 2000-355723

(51) Int. Cl.$^7$ ................................................. G01S 3/80
(52) U.S. Cl. ........................ 367/130; 367/118; 367/128; 367/907
(58) Field of Search ................................ 367/127, 128, 367/129, 130, 5, 6, 907, 118, 124

(56) References Cited

U.S. PATENT DOCUMENTS

| | | | | |
|---|---|---|---|---|
| 4,635,236 A | * | 1/1987 | Roberts | 367/130 |
| 4,924,446 A | * | 5/1990 | Cyr | 367/130 |
| 5,303,206 A | * | 4/1994 | Bemb et al. | 367/127 |
| 5,331,602 A | * | 7/1994 | McLaren | 367/127 |
| 6,256,264 B1 | * | 7/2001 | Beckman et al. | 367/124 |

* cited by examiner

*Primary Examiner*—Ian J. Lobo
(74) *Attorney, Agent, or Firm*—Oblon, Spivak, McClelland, Maier & Neustadt, P.C.

(57) ABSTRACT

An underwater object positioning system comprises a workboat, an acoustic transmitter-receiver mounted on the workboat, first and second surface tow units towed by the workboat, an acoustic transducer that is mounted on the first surface tow unit, that is connected by a communication cable to the acoustic transmitter-receiver on the workboat and that is positioned by a radio positioning means; two acoustic receivers that are mounted on the second surface tow unit, that are connected by a communication cable to the acoustic transmitter-receiver on the workboat and that are positioned by a radio positioning means. An acoustic pulse transmitter is mounted on a submerged positioning target. A processor unit on the workboat calculates the location of the submerged target based on data showing the positions of the transducer and receivers, and the distances from the transducer and receivers to the acoustic pulse transmitter.

11 Claims, 10 Drawing Sheets

UNDERWATER OBJECT POSITIONING SYSTEM

BACKGROUND OF THE INVENTION

1. Field of the Invention:

The present invention relates to an underwater positioning system for establishing the position of submerged moving bodies such as deep-sea tow devices and the like, or objects such as underwater piston corers and sunken ships. It particularly relates to a global positioning system or differential global positioning system (both of which are also collectively referred to herein as global positioning system, or GPS), as well as underwater object positioning systems that are a combination of acoustic positioning systems and Loran C and microwave-based short-range positioning systems.

2. Description of the Prior Art:

As shown in FIG. 11, a conventional long baseline (LBL) system for determining the position of a submerged moving object uses three acoustic transponders 4 that are placed at prescribed locations on the seabed. A transducer 3 is installed on the bottom of a workboat 2. The direct distance from the transducer 3 to each of the acoustic transponders 4 is measured by measuring the time it takes for an acoustic wave to travel from transducer 3 to acoustic transponder 4 and back to transducer 3, which is used to establish the position of the transducer 3 within the coordinate system formed by the acoustic transponders 4. By then measuring the direct distance from the submerged moving object 1 to the acoustic transponders 4, and the distance from the moving object 1 to the transducer 3 of the workboat 2, the position of the moving object 1 is established in terms of the coordinate system formed by the acoustic transponders 4.

In the conventional super-short baseline (SSBL) system, a transducer affixed to the bottom or side of a workboat transmits acoustic signals to an acoustic transponder on the submerged moving object, and the time it takes for the transmitted signals to be received is used to determine the direct distance to the object and the direction in which the object is moving.

FIG. 12 shows an improved version of the conventional LBL system. This system comprises an acoustic receiver 6 on a master workboat 2 and acoustic receivers 7 on two auxiliary workboats 5. Here, the submerged moving object 1 is a submersible research vehicle on which there is a synchronous pinger 8. The synchronous pinger 8 transmits pulses that include depth data,. and the pulses are received by the acoustic receivers 7 and used to determine the position of the submersible research vehicle 1.

LBL positioning systems have good positioning accuracy but require the use of at least three acoustic transponders, and have a range of about three or four square kilometers. In order to use such systems for large-area positioning applications, numerous transponders have to be located on the seabed. Moreover, the system has to be calibrated beforehand by determining the depth of the transponders and their relative locations. Thus, the positioning operation is not efficient.

While SSBL systems do not require the provision of multiple transponders or calibration and hence the positioning operation is efficient, they do have the drawback that the shortness of the baseline results in a decrease in accuracy when the system is used to determine positions over long distances.

The improved LBL system shown in FIG. 12 is a large-scale system, involving as it does the use of two auxiliary workboats and people to handle each boat. Moreover, noise generated by the screws of the master and auxiliary vessels can make it impossible to record the necessary measurement readings. Also, the system requires radio equipment to transmit data obtained by the auxiliary workboats to the master vessel, and in foreign waters, regulations on the use of radio transmission may make it impossible to use the system.

An object of the present invention is to solve the drawback of the foregoing conventional underwater object positioning systems and therefore to provide an underwater object positioning system that has good position measurement accuracy but does not require the installation of two or more seabed transponders, does not need to be calibrated, and also does not require auxiliary vessels, so it does not have to be made large-scale in terms of the system equipment involved.

SUMMARY OF THE INVENTION

To attain the above object, the present invention provides an underwater object positioning system comprising a workboat, an acoustic transmitter-receiver mounted on the workboat, first and second surface tow units towed by the workboat, an acoustic transducer that is mounted on the first surface tow unit, that is connected by a communication cable to the acoustic transmitter-receiver on the workboat and that is positioned by a radio positioning means, two acoustic receivers that are mounted on the second surface tow unit, that are connected by a communication cable to the acoustic transmitter-receiver on the workboat and that are positioned by a radio positioning means, an acoustic pulse transmitter mounted on a submerged positioning target, and a computing processor mounted on the workboat that computes a location of the submerged target based on positional data on positions of the acoustic transducer and each acoustic receiver, and distance data on distance from the acoustic transducer and acoustic receivers to the acoustic pulse transmitter.

The above radio positioning means can be a global positioning system. The acoustic pulse transmitter can be an acoustic transponder, a synchronous pinger or a synchronous responder. The submerged positioning target includes such objects as deep-sea tow devices towed by a workboat, sunken vessels lying on the seabed, piston corers used to obtain seabed samples, and divers.

In accordance with the above-described positioning system of this invention, first, the radio positioning means is used to determine the locations of the acoustic transducer on the first surface tow unit and the acoustic receivers on the second surface tow unit. The direct distance from the acoustic transducer on the first surface tow unit and the acoustic receivers on the second surface tow unit to the acoustic pulse transmitter on the positioning target is then obtained from the time it takes for a sound wave to traverse the distance. Since the acoustic pulse transmitter will be located at the point at which the three distance lines intersect on a spherical surface taken as a radius, the position of the submerged object can be determined by obtaining the point of intersection.

To simplify the computation and increase the positioning accuracy, the depth of the acoustic pulse transmitter is measured and the three direct distances and the depth are used to obtain each of the horizontal distances from the acoustic transducer on the first surface tow unit and the acoustic receivers on the second surface tow unit to the acoustic pulse transmitter.

In the positioning system according to the present invention, only one acoustic transponder has to be provided on the object concerned, eliminating the need in the case of a conventional LBL system to provide at least three transponders on the seabed and to carry out system calibration. Thus, the positioning range is increased. Moreover, surface tow units are used instead of auxiliary workboats, so the scale of the system equipment can be reduced and the need for people to handle the boats is also eliminated. In addition, since the data acquired by the acoustic transducers and receivers is transmitted to the acoustic pulse transmitter on the master workboat via cable, the system is not subject to radio-related regulations.

Further features of the invention, its nature and various advantages will be more apparent from the accompanying drawings and following detailed description of the invention.

DESCRIPTION OF THE PREFERRED EMBODIMENTS

Figure 1:
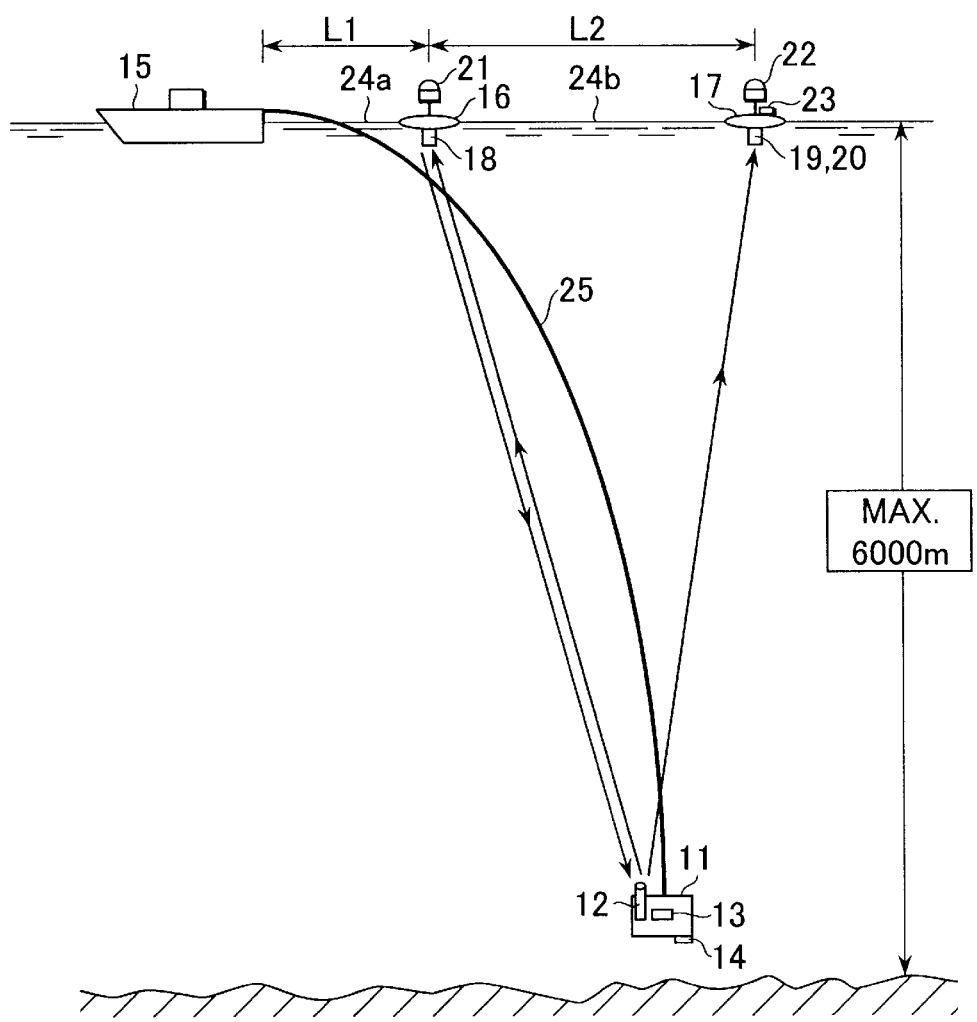
FIG. 1 is a front view of an underwater object positioning system according to a first embodiment of the invention.
Figure 2:
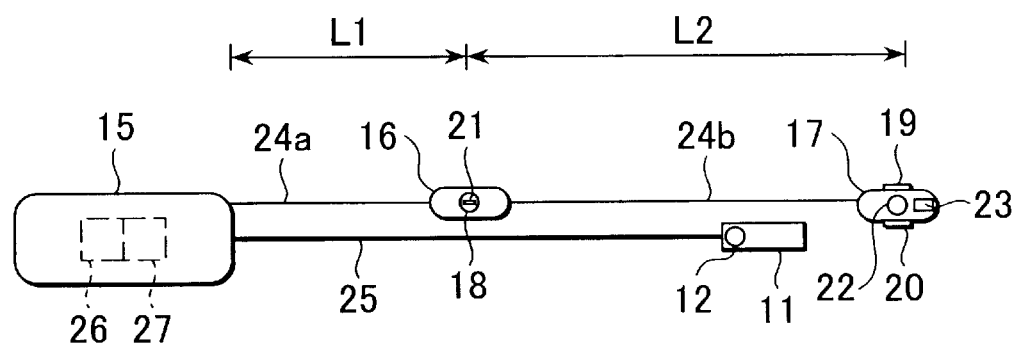
FIG. 2 is a plan view of the positioning system shown in FIG. 1.

FIGS. 1 and 2 are front and plan views, respectively, of a first embodiment of a system for determining the position of a submerged tow unit 11 used for seabed survey work and the like. An acoustic transponder 12, depth indicator 13 and seabed altimeter 14 are mounted on the submerged tow unit 11, which is towed by a workboat 15 via a second towline 25. In place of the transponder 12, there can be used a synchronous pinger that transmits sound waves at set intervals, or a responder that transmits sound waves in accordance with commands sent from the workboat via a communication cable (below, acoustic transponder, synchronous pinger and responder will also be collectively referred to as acoustic pulse transmitters). In the case of a synchronous pinger or a responder, an acoustic receiver can be used for acoustic transducer 18 of first surface tow unit 16.

The submerged tow unit 11 is moved according to the depth of the seabed, for which it can be submerged to a maximum depth of 6000 m. A pressure-type gauge can be used for the depth indicator 13.

Mounted on the first surface tow unit 16 are the acoustic transducer 18 and a radio positioning system 21. By means of a first towline 24a, the workboat 15 tows the first surface tow unit 16 at a distance L1 (which is, for example, around 50 m). Mounted on a second surface tow unit 17 are acoustic receivers 19 and 20, one on each side, and a radio positioning system 22. By means of a first towline 24b, the second surface tow unit 17 is towed by the workboat 15 at a distance L2 (which is, for example, around 100 m) behind the first surface tow unit 16. For the positioning systems 21 and 22, there may be used a global positioning system or differential global positioning system (both of which are also collectively referred to herein as global positioning system, or GPS), as well as Loran C and microwave-based short-range radio positioning systems (herein also referred to as radio positioning systems).

Compass 23 can be omitted if a GPS receiver is used as the radio positioning system 22 above the acoustic receivers 19 and 20 on the second surface tow unit 17. Distance L1 is suitably set at a distance that ensures the transducer 18 is not affected by the noise of the workboat 15. Distance L2 is suitably set in accordance with the desired positioning accuracy. A length of 2 m and a width of 1 m are sufficiently large for the surface tow units 16 and 17; surfboards can be used for the purpose.

Figure 3:
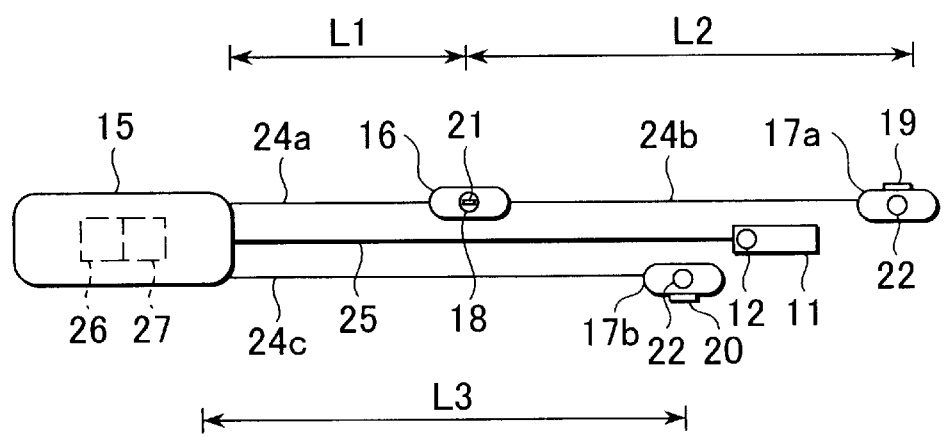
FIG. 3 is a plan view of a positioning system according to a second embodiment of the invention.

FIG. 3 shows a second embodiment of the positioning system of FIGS. 1 and 2. While in the embodiment of FIGS. 1 and 2 the one second surface tow unit 17 is provided with the two transducers 19 and 20, in the embodiment shown in FIG. 3, there are two second surface tow units 17a and 17b, each of which has one transducer. The second tow unit 17a is towed by the workboat 15 via the first surface tow unit 16 that is between the first towlines 24a and 24b similar to the embodiment in FIG. 1. The additional second tow unit 17b is towed directly by, and at a distance L3 from, the workboat 15 by means of a first towline 24c, parallel to the first surface tow unit 16. As a result, the first surface tow unit 16 and the second tow units 17a and 17b form a triangular baseline. This baseline is longer than the one in the first embodiment, which improves the accuracy of the positioning system. In the case of this arrangement, the compass can be omitted if a radio positioning system 22 is also provided on the second tow unit 17b.

Figure 4:
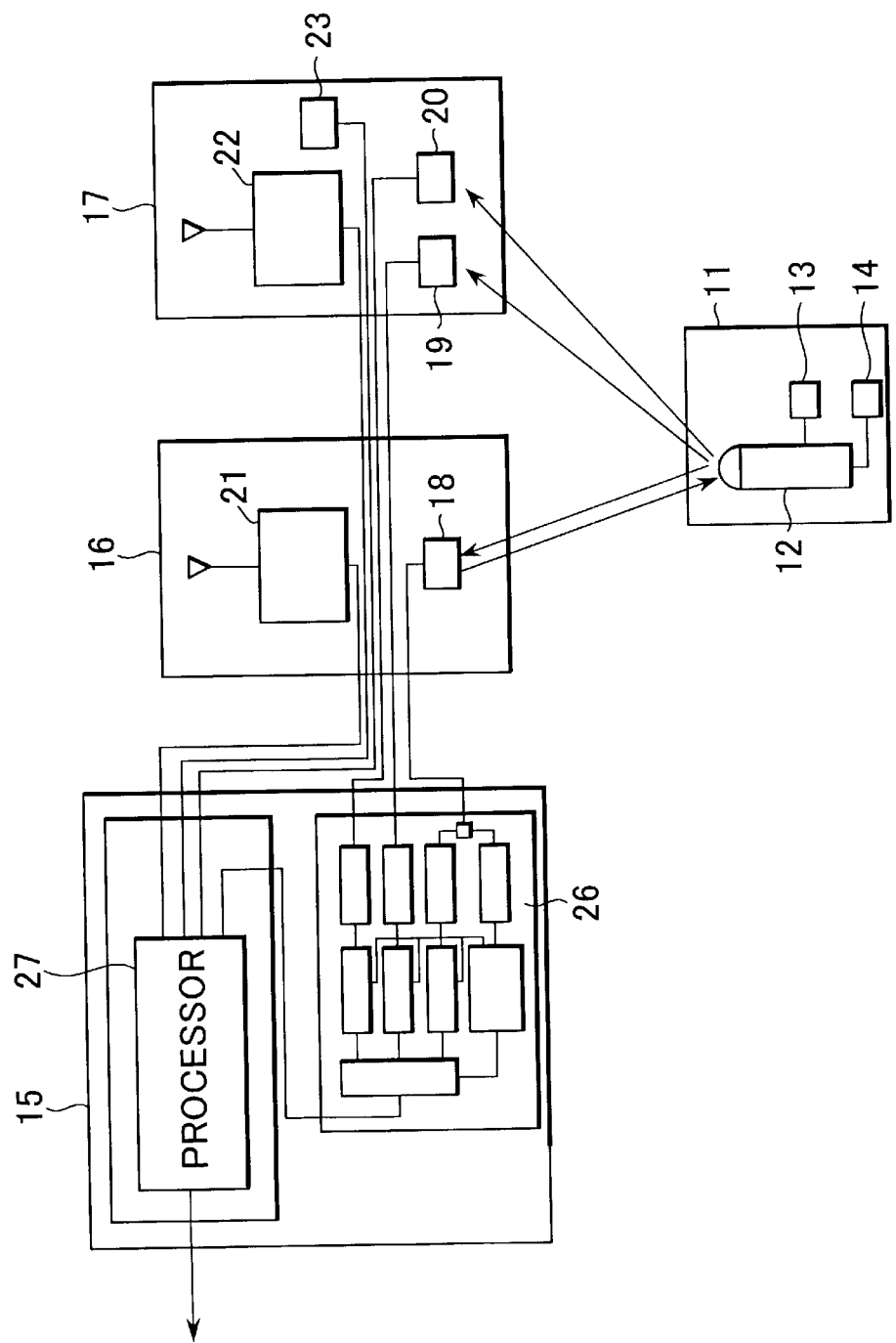
FIG. 4 is a block diagram illustrating an example of information processing by the positioning system of the invention.

FIG. 4 shows the apparatus used to process acoustic pulses and other information. An acoustic transmitter-receiver 26 and a processor 27 are installed on the workboat 15. The acoustic transmitter-receiver 26 is connected with the transducer 18 and acoustic receivers 19 and 20 by a communication cable included in the towline, and the processor 27 is connected to the radio positioning systems 21 and 22 and the compass 23 by a communication cable included in the towline.

Acoustic pulses transmitted from the transducer 18 provided on the first tow unit 16 are received by the transponder 12 on the submerged tow unit 11. The transponder 12 transmits acoustic pulses based on the received pulses. As described above, a synchronous pinger or a responder can be used instead of an acoustic transponder. A pinger or responder transmits its own acoustic pulses, eliminating the need to transmit pulses from the transducer.

Depth data from the depth indicator 13 is subjected to pulse-interval modulation and transmitted by the transponder 12 as second acoustic pulses. First acoustic pulses transmitted by the transponder 12 are received by the transducer 18 and the acoustic receivers 19 and 20, and the acoustic transmitter-receiver 26 on the workboat 15 is used to measure the time from the transmission from the transducer 18 to the reception by the transducer 18 and acoustic receivers 19 and 20.

Figure 5:
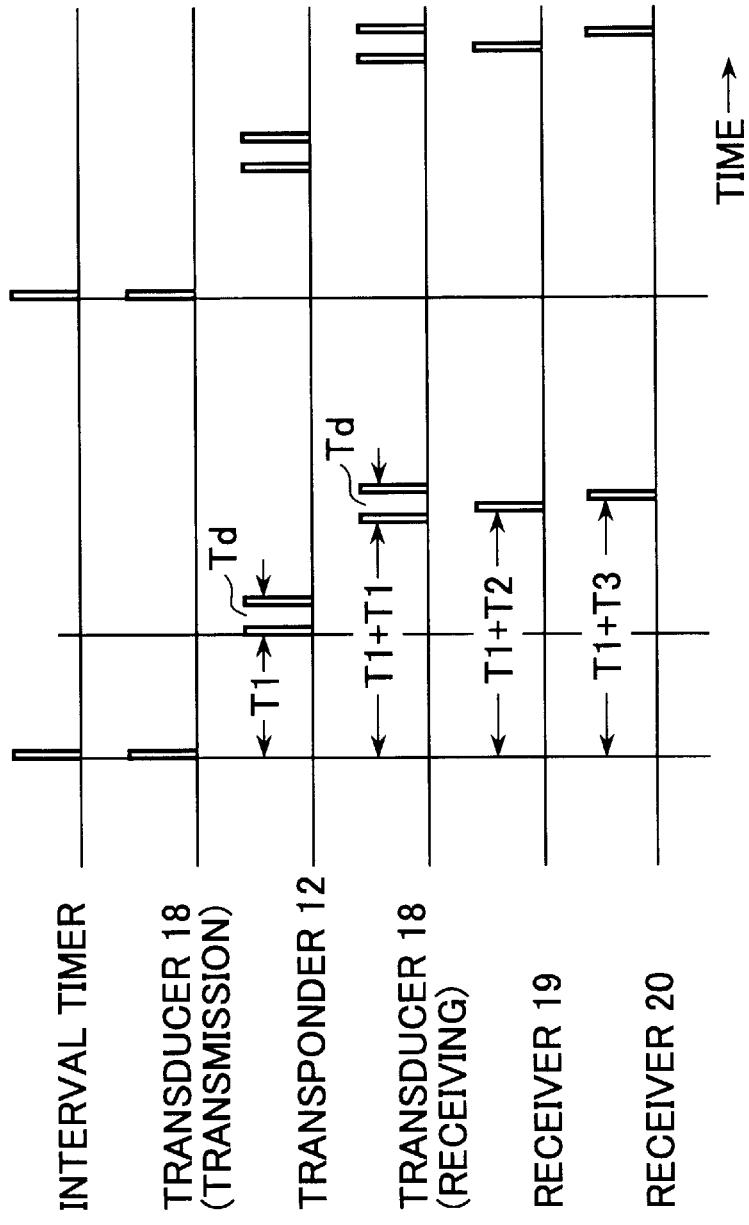
FIG. 5 is a timing chart relating to the acoustic pulse transmission and receiving states of the units of the positioning system.

Determining the position of the submerged tow unit 11 will now be explained with reference to FIGS. 5 and 6. First, a GPS receiver 21 constituting the positioning system is used to determine the position (a1, b1) of the transducer 18 on the first surface tow unit 16, and the positions (a2, b2), (a3, b3) of the acoustic receivers 19 and 20 on the second surface tow unit 17 are determined by combining compass 23 bearing data and positioning data from a GPS receiver 22 (in the case of the embodiment of FIGS. 1 and 2), or by means of the positioning data from the GPS receiver 22 (in the case of the embodiment shown in FIG. 3). Next, first pulses transmitted by the transponder 12 on the submerged tow unit 11 are received by the transducer 18 and the receivers 19 and 20, and the acoustic transmitterreceiver 26 measures the times T1, T2, T3 it takes for the transmission from the transducer 18 to be received by the transducer 18 and receivers 19 and 20.

If V is the acoustic velocity, the direct distances R1, R2, R3 from the transponder 12 to the transducer 18, receiver 19 and receiver 20 can be obtained thus: R1=V×T1, R2=V×T2, R3=V×T3. Since the acoustic transponder 12 will be located at the point at which R1, R2, R3 intersect on a spherical surface taken as a radius, the position of the transponder 12 can be calculated from the direct distances R1, R2, R3. The calculations can be simplified and positioning accuracy improved by measuring the depth D of the transponder 12. The depth D of the transponder 12 can be calculated as the second pulses from the transponder 12 received by the transducer 18. So, the horizontal distances S1, S2, S3 from the transponder 12 to the transducer 18, receiver 19 and receiver 20 can be obtained thus: $S1^2=R1^2-D^2$, $S2^2=R2^2-D^2$, $S3^2=R3^2-D^2$.

Figure 6:
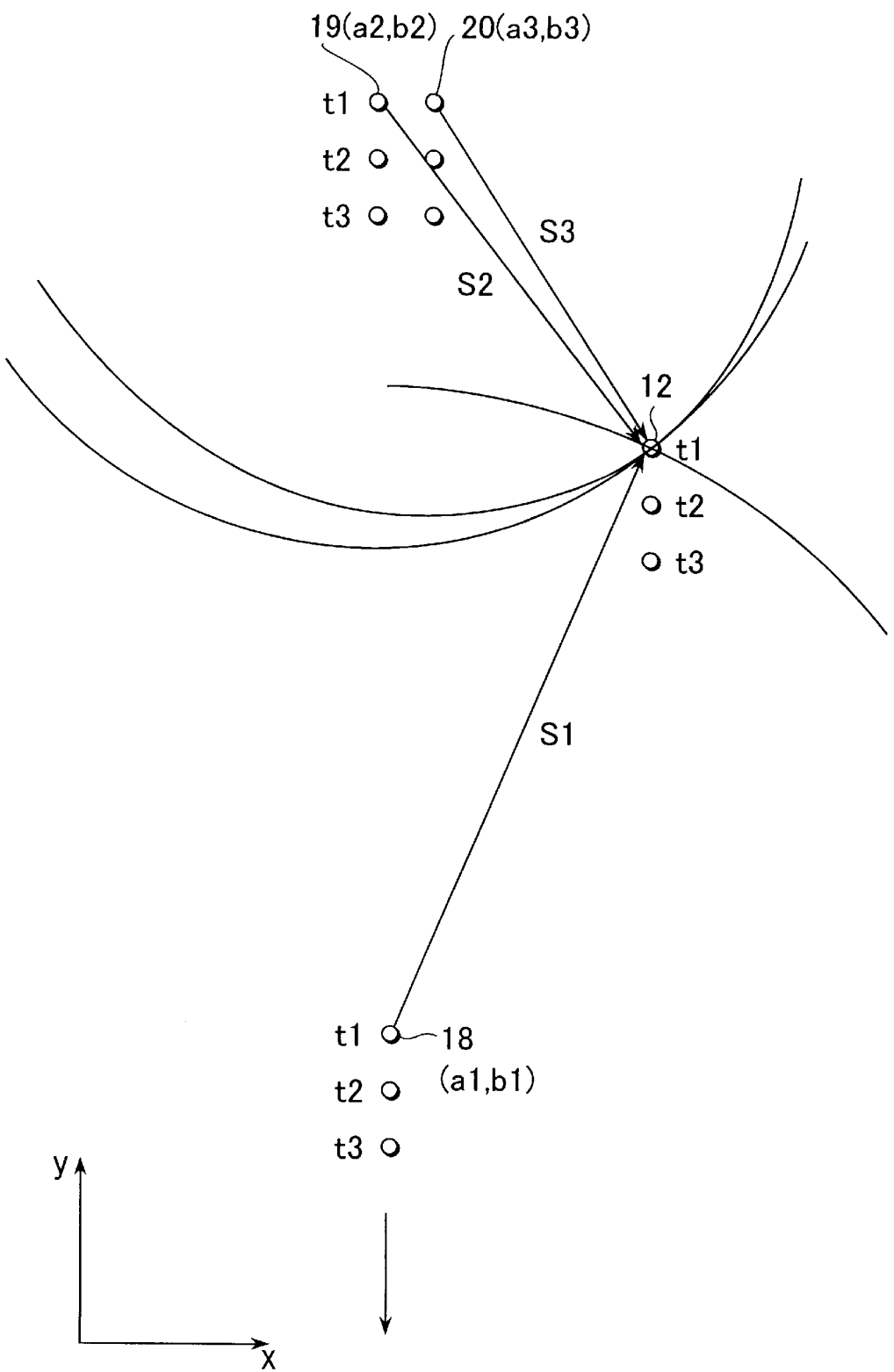
FIG. 6 illustrates the determining of the position of a deep-sea tow device by means of the positioning system of the invention.

As shown in FIG. 6, the point at which S1, S2, S3 intersect is the position (x, y) of the transponder 12 on the submerged tow unit 11 at time $t_1$. The position (x, y) can be obtained as follows:

$$(x-a1)^2+(y-b1)^2=S1^2$$

$$(x-a2)^2+(y-b2)^2=S2^2$$

$$(x-a3)^2+(y-b3)^2=S3^2$$

In FIG. 6, $t_2$, $t_3$ each indicate a position to which the transducer 18, receiver 19, receiver 20 and transponder 12 have moved after the elapse of the respective times $t_2$ and $t_3$.

While in the above example a transponder 12 is mounted on the submerged tow unit 11, a synchronous pinger or a responder may be used instead of the transponder 12. An acoustic transponder does not send a response if it cannot receive the acoustic signal transmitted from the surface, but a synchronous pinger or responder can transmit an acoustic response even without an acoustic signal being received. However, a lack of synchronization between the workboat and the submerged pinger can give rise to error in the range data.

With an offline tow system in which the submerged tow unit 11 is towed by the towline 25 (a system in which seabed status information is not transmitted online to the workboat), it is necessary to take care to ensure that the tow unit does not hit the seabed. For that, an echo sounder or other such seabed depth finder can be connected to the transponder 12 to measure the height from the seabed and the information subjected to pulse-interval modulation and transmitted as third pulses.

Figure 7:
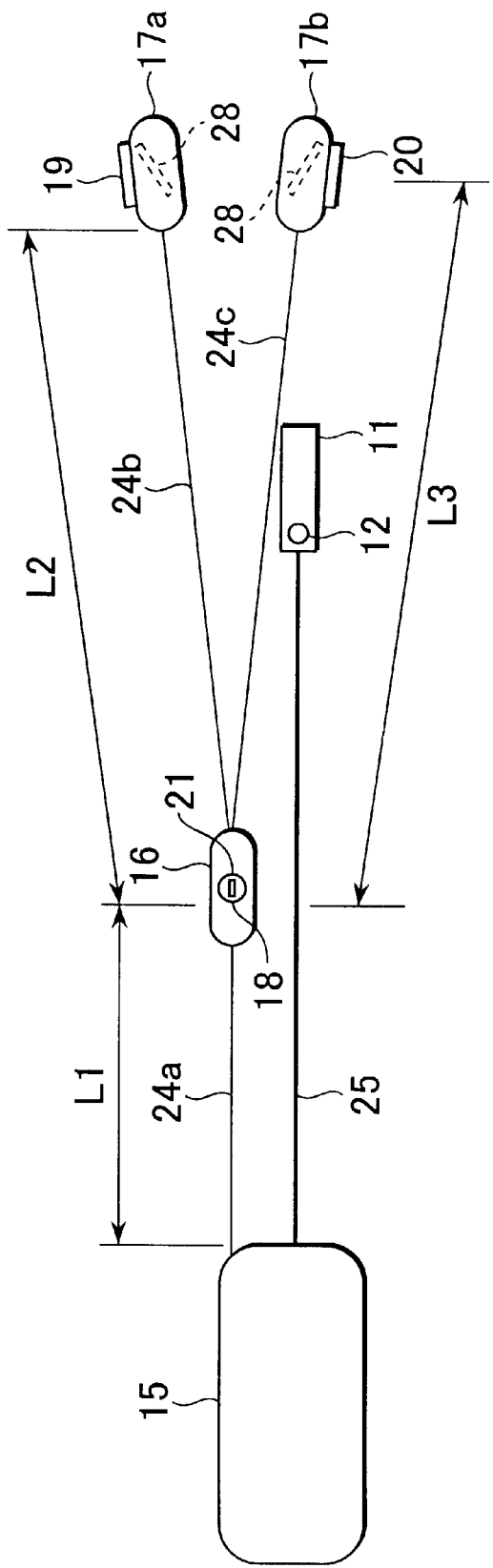
FIG. 7 is a plan view of a third embodiment of the positioning system of the invention.

FIG. 7 shows a third embodiment of the underwater object positioning system of the present invention. In the second embodiment a first surface tow unit 16 having an acoustic receiver 20 is towed and a second tow unit 17b with an acoustic receiver 19 is towed directly by the workboat 15. In the case of this third embodiment, the receiver 19 is provided on a second tow unit 17a and the receiver 20 is provided on a second tow unit 17b. A prescribed distance is maintained between the tow units, which are connected to a first surface tow unit 16 by first surface towlines 24b and 24c. The second tow units 17a and 17b each have an adjustable rudder 28 that can be set to maintain the prescribed separation between the tow units 17a and 17b. In the foregoing invention, he first surface tow unit 16 and the second tow units 17a and 17b form a Y shape that makes it possible to readily set the distance between the transducer 18 and the receivers 19 and 20, which helps to improve positioning accuracy.

To this point the system has been described with reference to the first surface tow unit 16 and second surface tow unit 17 being towed as the workboat 15 moves ahead and positions are determined. In the following, the explanation relates to the determination of the position of a submerged object while the workboat is not moving or is drifting.

Figure 8:
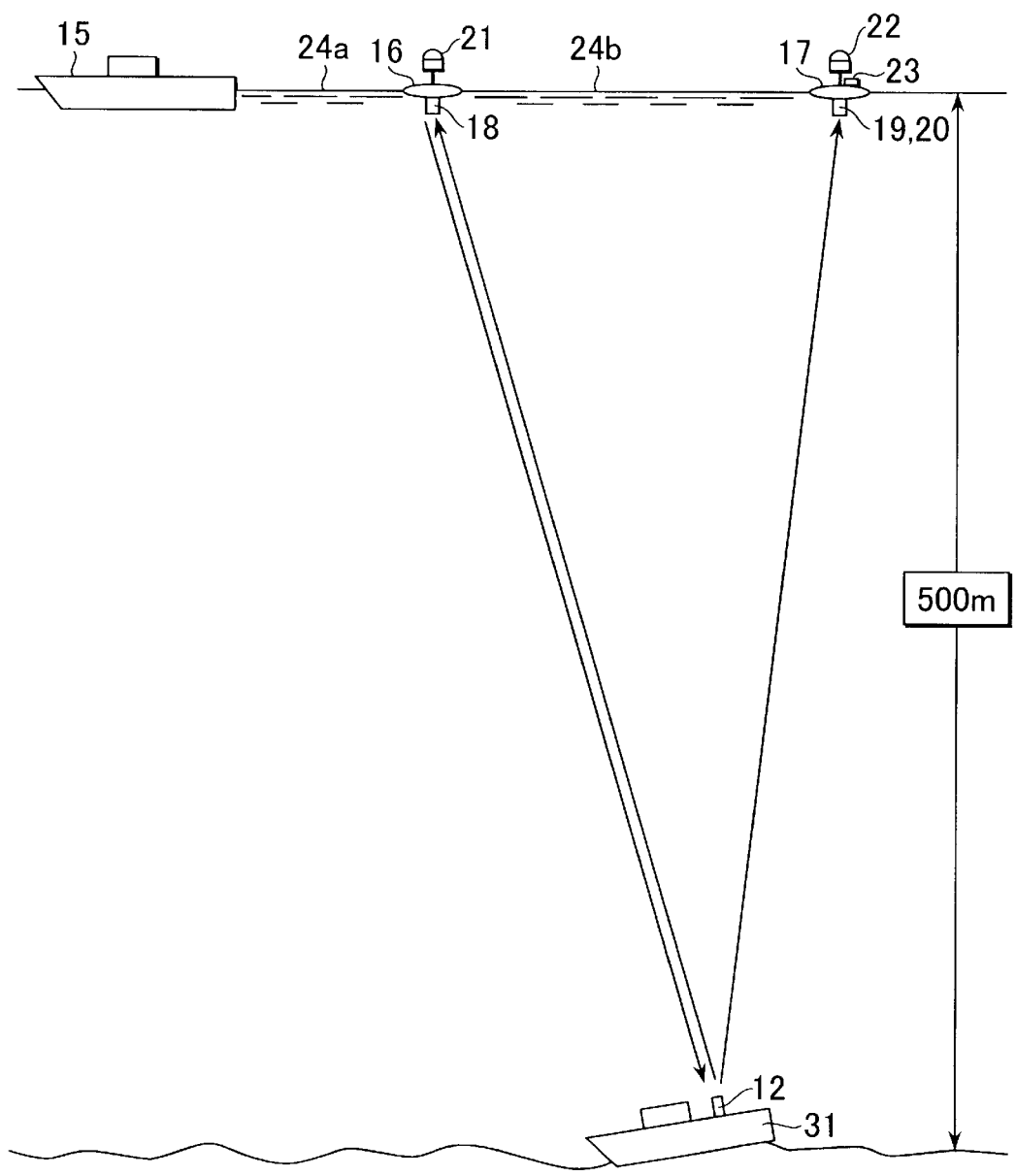
FIG. 8 illustrates the use of the positioning system of the invention to determine the position of a sunken ship.

FIG. 8 illustrates an example of the determining of the position of a sunken ship. When a sunken vessel is to be raised, determining the position of the vessel is of critical importance with respect to improving the efficiency of the operation.

First, an acoustic transponder 12 is attached to the sunken ship 31 on the seabed. In the illustrated example, the workboat 15, first surface tow unit 16 equipped with a positioning system 21 and acoustic transducer 18 and second surface tow unit 17 equipped with acoustic receivers 19 and 20, positioning system 22 and compass 23 are adrift. In the same way as described in the foregoing, first, the positioning systems and the compass are used to determine the positions of the transducer 18 and receivers 19 and 20. The transducer 18 transmits an acoustic signal towards the transponder 12 on the ship 31, and first pulses from the transponder 12 are received by the transducer 18 and receivers 19 and 20. The acoustic transmitter-receiver on the workboat 15 measures the respective times T1, T2, T3 it takes from the transmission from the transducer 18 to the reception by the transducer 18 and receivers 19 and 20, to obtain the direct distances R1, R2, R3 between the transponder 12 and the transducer 18 and receivers 19 and 20, thereby determining the position of the sunken ship 31.

Figure 9:
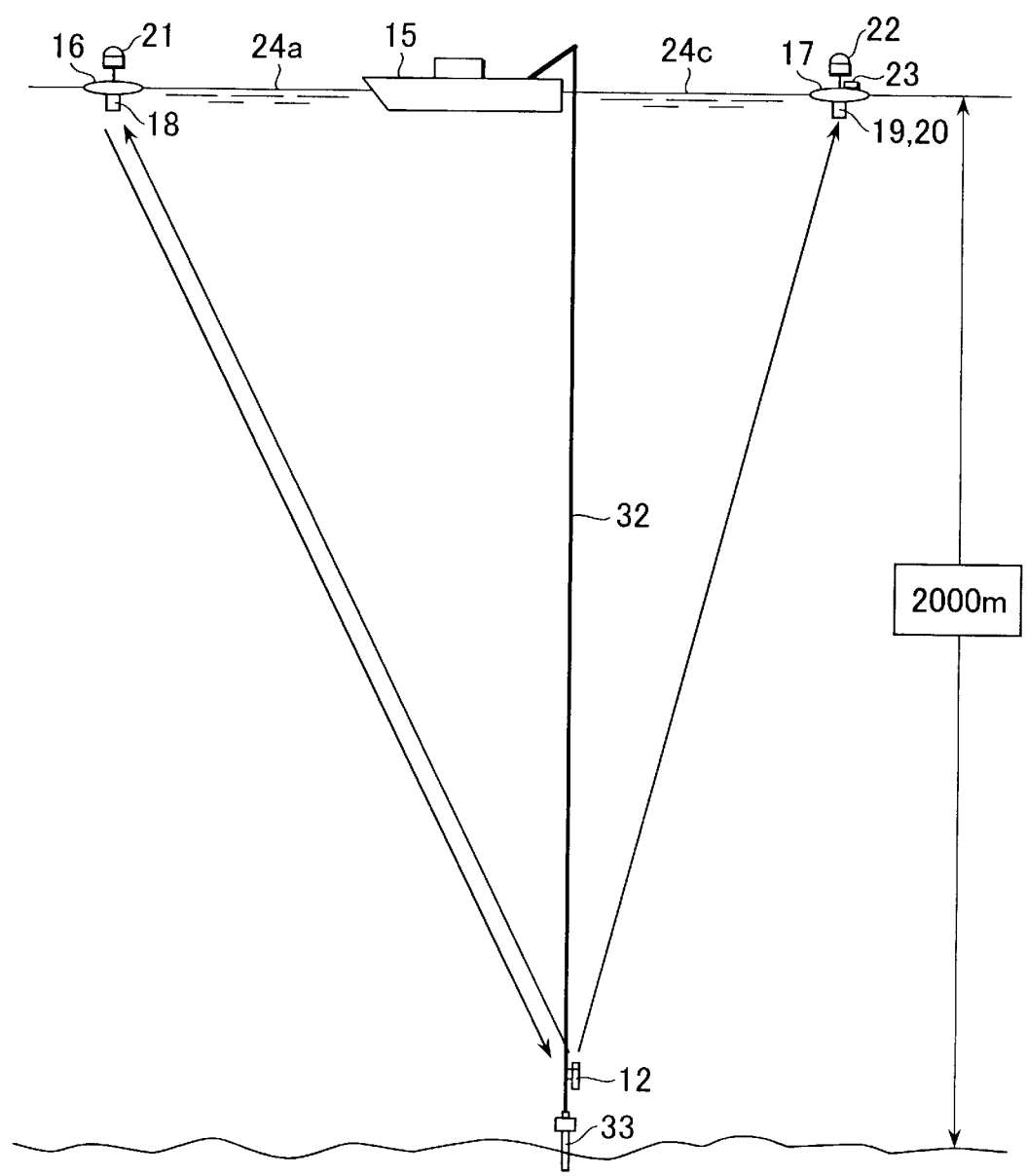
FIG. 9 illustrates the use of the positioning system of the invention to determine the position of a seabed piston corer.

FIG. 9 is used to show how the position of a piston corer is determined. Piston corers are used to obtain samples of seabed deposits. The piston corer 33 is lowered from the workboat 15 on the end of a wire 32, until the corer touches the seabed. A weight (not shown) is dropped to drive the corer 33 into the deposits and obtain a cylindrical sample. There is a transponder 12 attached to the end of the wire 32. From the transducer 18 on the first surface tow unit 16, an acoustic signal is transmitted to the transponder 12, and the first pulses relayed by the transponder 12 are received by the transducer 18 on the first surface tow unit 16 and the receivers 19 and 20 on the second surface tow unit 17. The location at which the corer 33 obtained the sample can be determined from the data thus obtained.

Figure 10:
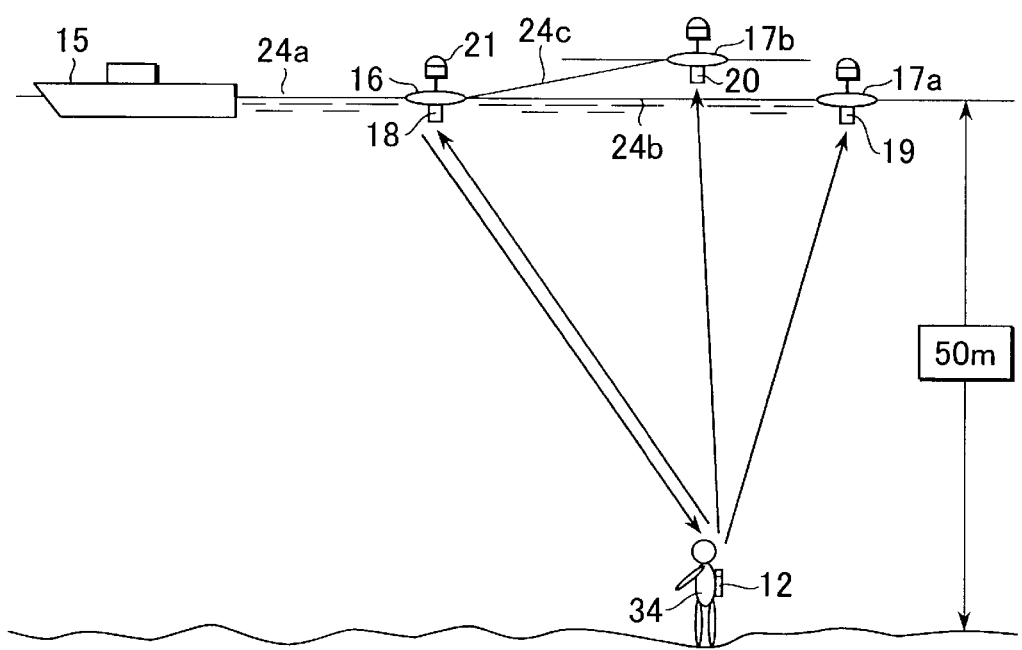
FIG. 10 illustrates the use of the positioning system of the invention to determine the position of a diver.
Figure 11:
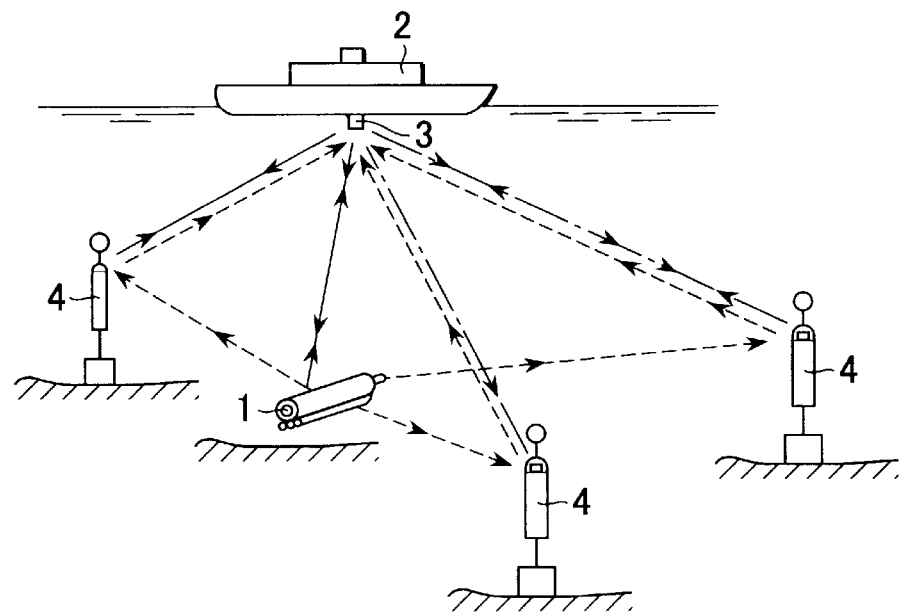
FIG. 11 illustrates a prior-art LBL underwater positioning system.

FIG. 10 is used to show how the position of a diver is determined. Determining the position of divers is important in terms of ensuring the safety of divers engaged in seabed operations. To enable the position of a diver 34 to be determined, first a transponder 12 is attached to the diving suit of the diver 34. In the same way as described above, the transducer 18 on the first surface tow unit 16 transmits an acoustic signal at the transponder 12. The first signal pulses transmitted back from the transponder 12 are received by the transducer 18 and by the receivers 19 and 20 on the second surface tow units 17a and 17b and the data thus obtained is used to confirm the current location of the diver.

In accordance with the positioning system of the invention described in the foregoing, radio positioning systems such as GPS units mounted on first and second surface tow units are used to determine the positions of a transducer on the first surface tow unit and receivers on the second surface tow units. Then, the direct distances from the transducer on the first surface tow unit and receivers on the second surface tow units to the transponder, together with data indicating the depth of the submerged tow unit, are used to obtain the horizontal distance from the first and second surface tow units to the submerged tow unit, thereby enabling the position of the submerged tow unit to be determined.

Figure 12:
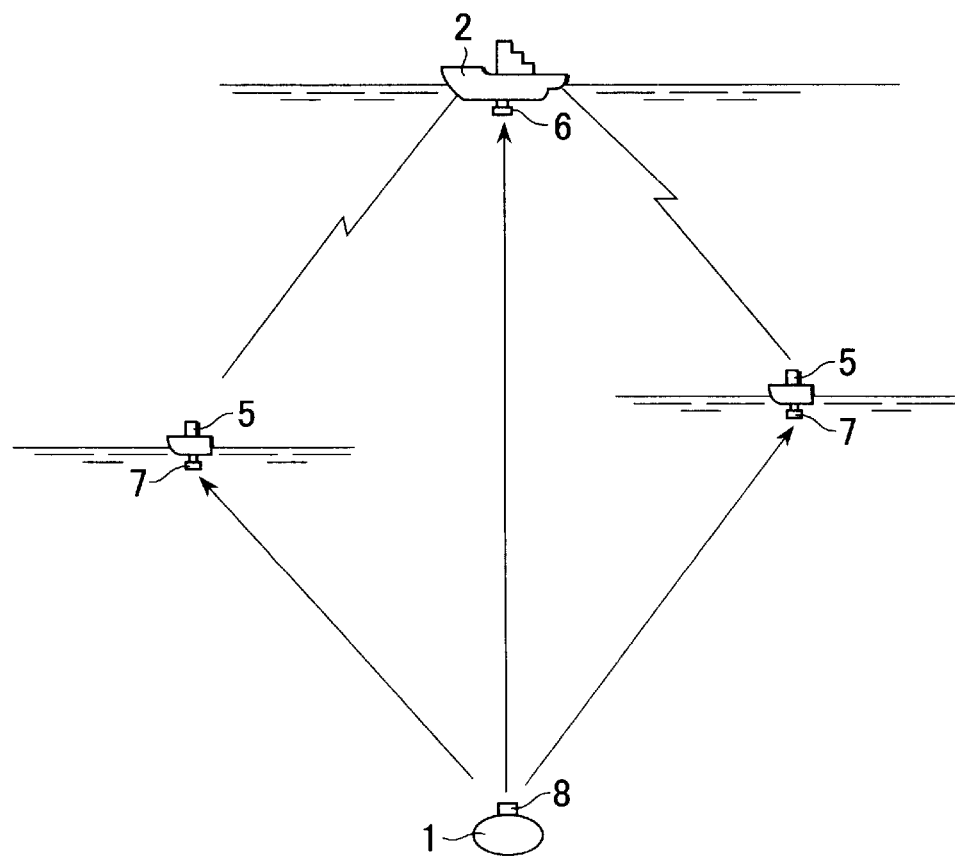
FIG. 12 illustrates a prior-art underwater positioning system comprising a master workboat and auxiliary workboats.

This eliminates the need in the case of a conventional LBL system to provide at least three transponders on the seabed and to carry out system calibration, and since there is no limitation on the installation range of the transponders, the range of the positioning system is increased. Moreover, the system has a longer baseline than that of a conventional SSBL system, which improves the positioning accuracy. In addition, since surface tow units are used instead of the master and auxiliary workboats required by the conventional system shown in FIG. 12, the scale of the system equipment can be reduced and the need for people to man the boats is also eliminated. Since the surface tow units mounting receivers have no screw that generates noise, positioning accuracy doe not deteriorate. Also, since the data acquired by the acoustic transducers and receivers is transmitted to the acoustic pulse transmitter on the master workboat via a cable connection, the system is not subject to regulations relating to the use of radio systems.

What is claimed is:

1. An underwater object positioning system comprising:
   a workboat;
   an acoustic transmitter-receiver mounted on the workboat;
   first and second surface tow units towed by the workboat;
   an acoustic transducer mounted on the first surface tow unit connected by a communication cable to the acoustic transmitter-receiver on the workboat and positioned by radio positioning means;
   two acoustic receivers mounted on the second surface tow unit, connected by a communication cable to the acoustic transmitter-receiver on the workboat and positioned by said radio positioning means;
   an acoustic pulse transmitter mounted on a submerged positioning object; and
   a computing processor mounted on the workboat that computes a location of the submerged object based on positional data including positions of the acoustic transducer and each acoustic receiver, and distance data including distances from the acoustic transducer and acoustic receivers to the acoustic pulse transmitter.

2. A positioning system according to claim 1, wherein the radio positioning means is a global positioning system.

3. A positioning system according to claim 1, wherein the acoustic pulse transmitter is an acoustic transponder.

4. A positioning system according to claim 1, wherein the acoustic pulse transmitter is a synchronous pinger.

5. A positioning system according to claim 1, wherein the acoustic pulse transmitter is a synchronous responder.

6. A positioning system according to claim 1, wherein the submerged positioning object is a submerged tow unit towed by the workboat.

7. A positioning system according to claim 6, wherein the submerged tow unit has a depth indicator.

8. A positioning system according to claim 6, wherein the submerged tow unit has a seabed altimeter.

9. A positioning system according to claim 1, wherein the submerged positioning object is a sunken ship.

10. A positioning system according to claim 1, wherein the submerged positioning object is a piston corer.

11. A positioning system according to claim 1, wherein the submerged positioning object is a diver.

* * * * *